M. LEWIN.
THEATRICAL APPLIANCE.
APPLICATION FILED DEC. 11, 1914.
1,150,869.  Patented Aug. 24, 1915.
2 SHEETS—SHEET 2.
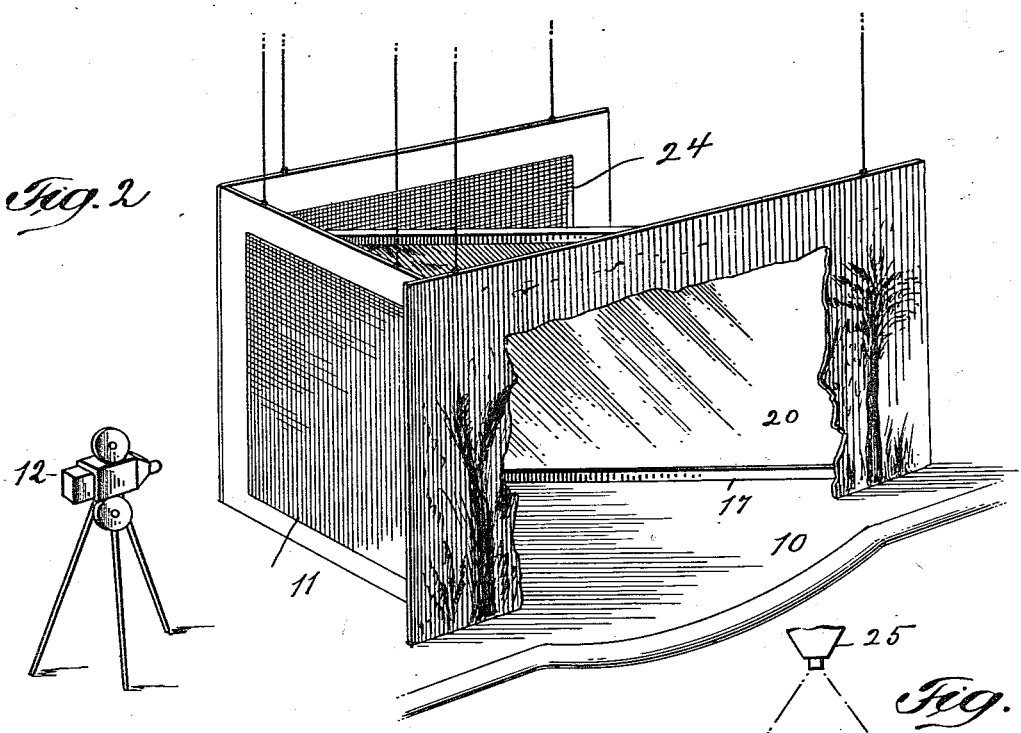
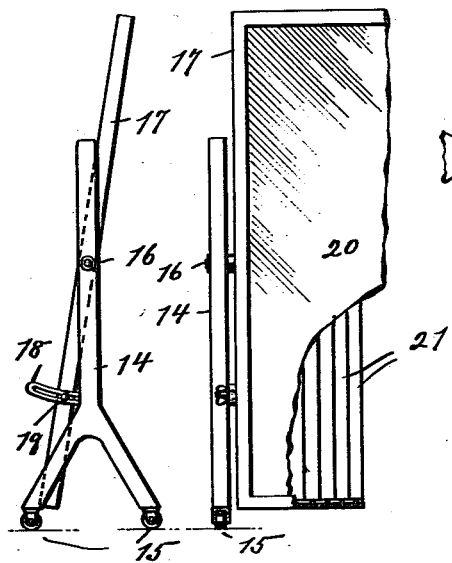
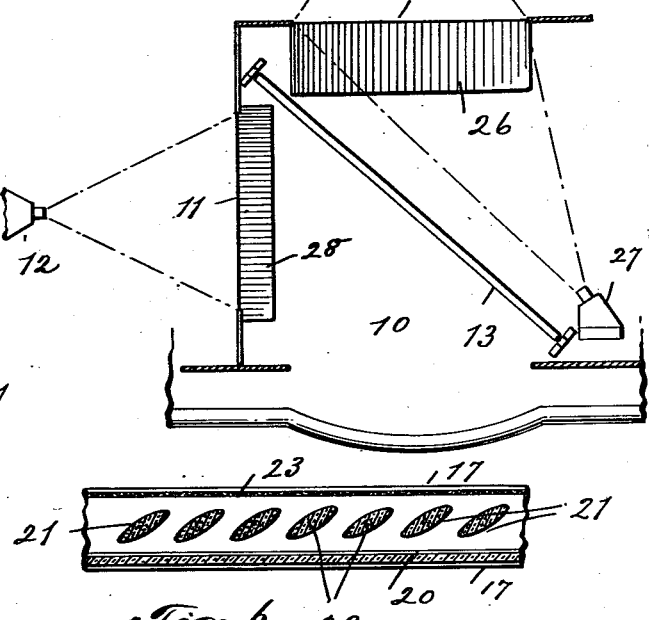
Witnesses:
Inventor
Moritz Lewin
By his Attorneys
Briesen & Jumpe

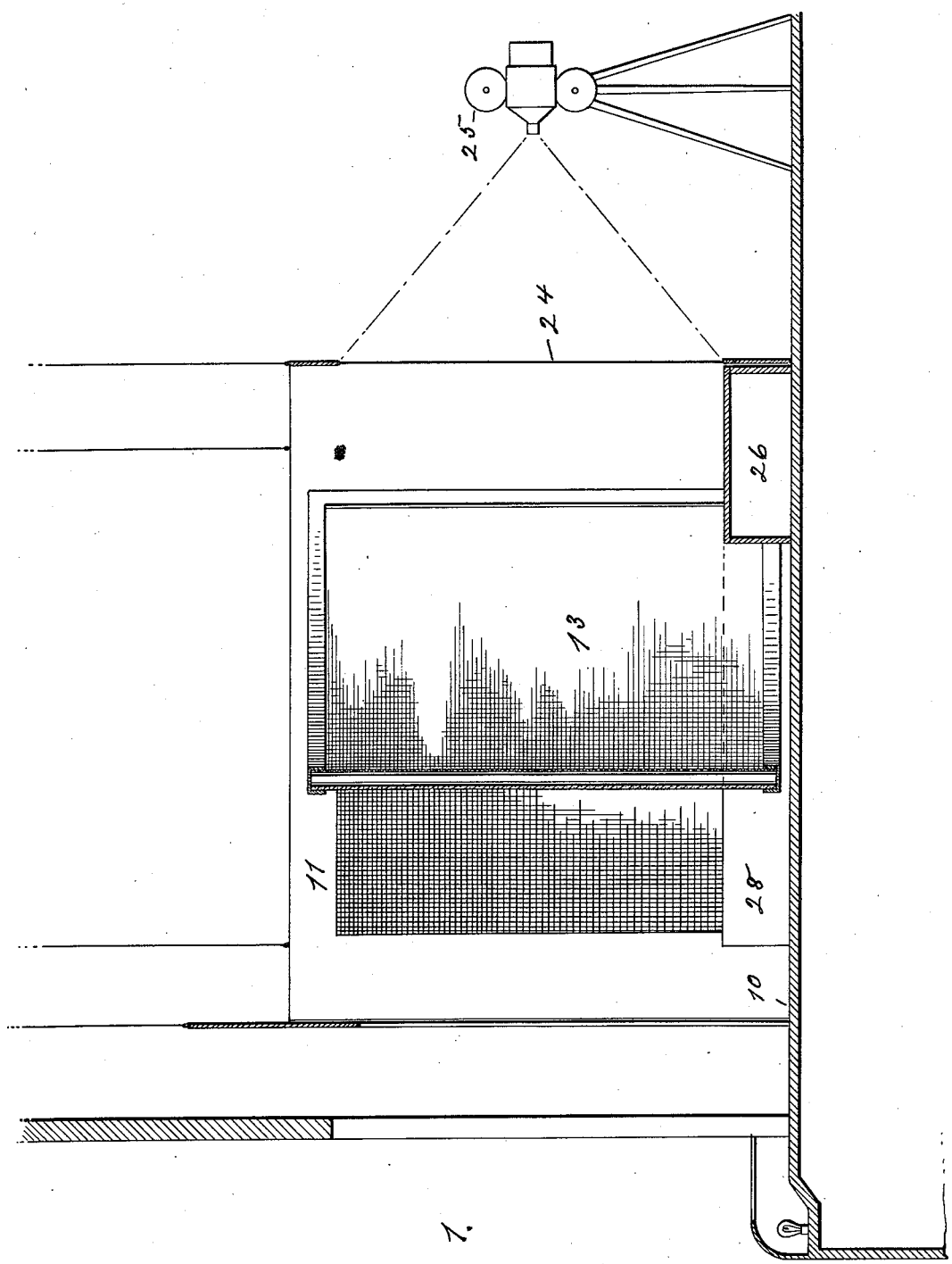

UNITED STATES PATENT OFFICE.

MORITZ LEWIN, OF NEW YORK, N. Y., ASSIGNOR TO HENRY WATERSON, OF NEW YORK, N. Y.

THEATRICAL APPLIANCE.

1,150,869.  Specification of Letters Patent.  Patented Aug. 24, 1915.

Application filed December 11, 1914. Serial No. 876,635.

*To all whom it may concern:*

Be it known that I, MORITZ LEWIN, a citizen of the German Empire, and a resident of New York city, in the county and State of New York, have invented certain new and useful Improvements in Theatrical Appliances, of which the following is a specification.

This invention relates to a theatrical appliance of novel construction by means of which cinematographic figures may be projected upon the stage in a plastic manner, so as to assume a very realistic appearance and to be well set off from the background.

The invention comprises the various features of construction by means of which this desirable result is obtained, all as more fully pointed out in the specification and appended claims.

In the accompanying drawing, Figure 1 is a vertical longitudinal section of a theatrical appliance embodying my invention; Fig. 2 a perspective view thereof; Fig. 3 a plan; Fig. 4 an end view of the mirror; Fig. 5 a front view partly broken away of part thereof, and Fig. 6 an enlarged cross section through part of the mirror.

At one side of the stage 10, there is arranged at right angles to the stage-front, a transparent screen 11, upon the back or outer side of which moving figures are adapted to be thrown by means of a cinematographic projecting apparatus 12.

Obliquely across the stage there extends a transparent mirror 13, from which the figures appearing on screen 11, are reflected so as to be displayed to the audience. The construction of the mirror is such that the figures will be so reflected by it as to assume a plastic shape, thus resembling living and other solid bodies in space. With this end in view the mirror comprises standards 14, mounted on casters 15, so that the device may be moved about and set at various angles vertically to the screen. To standards 14, is pivoted at 16, a frame 17, which is adapted to be set at various dips or inclinations to the vertical, so as to compensate for any untrue position of screen 11 due to local causes. A slotted segment 18 projecting from one of the standards 14, and engaged by a pin 19 of frame 17, serves to maintain the latter in its selected position. Within frame 17 there is mounted a front glass plate 20, and some distance back of this plate, there are arranged a plurality of upright glass bars or reflecting members 21 which are of oval shape in cross section. These bars are provided with upper and lower gudgeons 22, swiveled to the horizontal members of frame 17, so that in this way the bars may be set at different angles to glass plate 20. Back of bars 21 there is mounted in the frame, a transparent backing 23 made of chiffon or similar diaphanous material. By the peculiar construction described, the images thrown upon the mirror from screen 11, will be reflected by two separate and distinct agents so that in this way, the plastic effect desired will be obtained. This effect may be increased or diminished by setting the bars 21 at different angles to glass plate 20.

At the back of the stage there is mounted a second transparent screen 24, arranged in substantial parallelism to the stage front and therefore also at an angle to transparent mirror 13. Upon the back or rear face of this screen are adapted to be thrown scenic backgrounds by means of a cinematographic projecting apparatus 25. This background will be visibly displayed to the audience through the transparent mirror, in such a manner, as to appear set back from the plastic figures reflected by the mirror from screen 11, so that in this way, a very realistic stage effect is obtained.

At the foot of screen 24, and consequently back of mirror 13 there is mounted upon the stage a raised platform 26, illuminated by source of light 27 and adapted for the accommodation of living actors, who may participate in the production of the play. These actors will also be visible to the audience through mirror 13, but their forms will be somewhat veiled by the diaphanous backing 23, so as not to be unduly obtrusive.

In order to permit the operator to so adjust the film, that the pictures appearing on screen 11 will register at their base line with the level of platform 26, there is mounted at the foot of screen 11 a step 28, the height of which corresponds to that of the platform. The operator is thus enabled to use the step as a gage by means of which he is enabled to vertically set his film, while the platform itself constitutes a gage for setting the pictures on screen 24. In this way the proper correlation between all the elements displayed may be insured. It will be seen that the above described apparatus permits the display of cinematographic pictures, with or without the assistance of living actors, in a highly realistic manner, so that the artistic beauty of the performance is enhanced and the pleasure derived by the audience is accordingly increased.

I claim:

1. A theatrical appliance comprising a stage, a cinematographic screen mounted at one side thereof, a second cinematographic screen mounted at the back thereof, and a transparent mirror extending obliquely across the stage, said mirror being adapted to be set at different vertical angles to said screens.

2. A theatrical appliance comprising a stage, a cinematographic screen mounted at one side thereof, and a co-acting mirror set obliquely across the stage, and having a plurality of reflecting members.

3. A theatrical appliance comprising a mirror having a glass front and a plurality of glass bars back of said front.

4. A theatrical appliance comprising a mirror having a glass front, a plurality of upright glass bars back of said front, and a diaphanous backing.

5. A theatrical appliance comprising a mirror having a frame, a glass front carried by said frame, and a plurality of glass bars pivoted to the frame back of said front, said bars being oval in cross section.

6. A theatrical appliance comprising a mirror having a frame, a glass front carried by said frame, a plurality of glass bars pivoted to the frame, back of the front, and a diaphanous backing carried by the frame in the rear of the glass bars.

7. A theatrical appliance comprising a side screen, a gage at the foot thereof, a back screen, a platform at the foot of the back screen, said gage being adapted to register with said platform, and a transparent mirror arranged obliquely to both of said screens.

8. A theatrical appliance comprising a side screen, a gage at the foot thereof, a back screen, a platform at the foot of the back screen, and a transparent mirror arranged obliquely to both of said screens, said mirror being adapted to be set at various angles and at various dips to said screens.

9. A theatrical appliance comprising a side screen, a back screen, and a coacting transparent mirror set obliquely to both of said screens and provided with a plurality of reflecting members and with a diaphanous backing at the rear of said members.

MORITZ LEWIN.

Witnesses:
FRANK V. BRIESEN,
MADELINE L. HIRSCH.